Patented Oct. 31, 1939

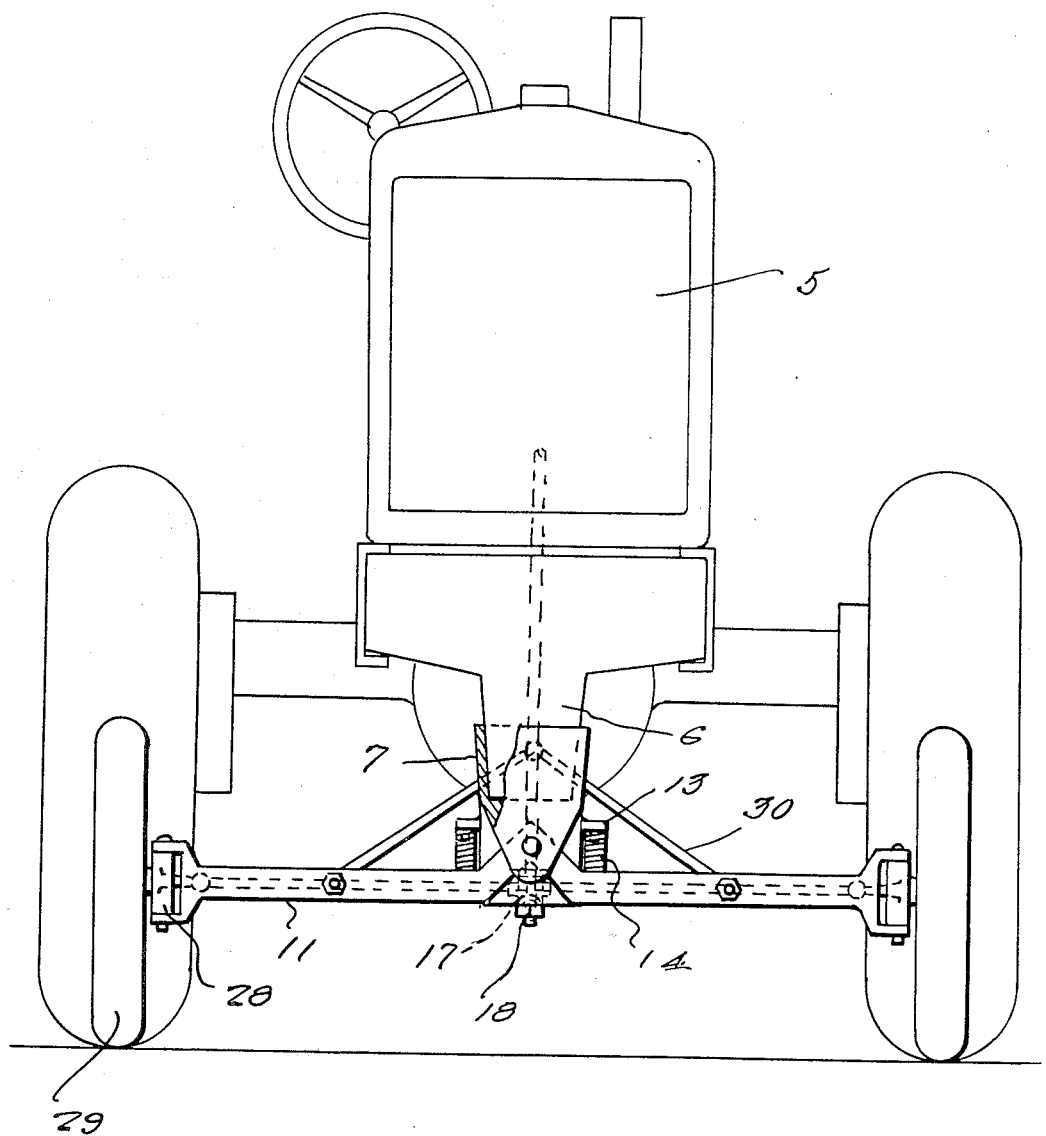

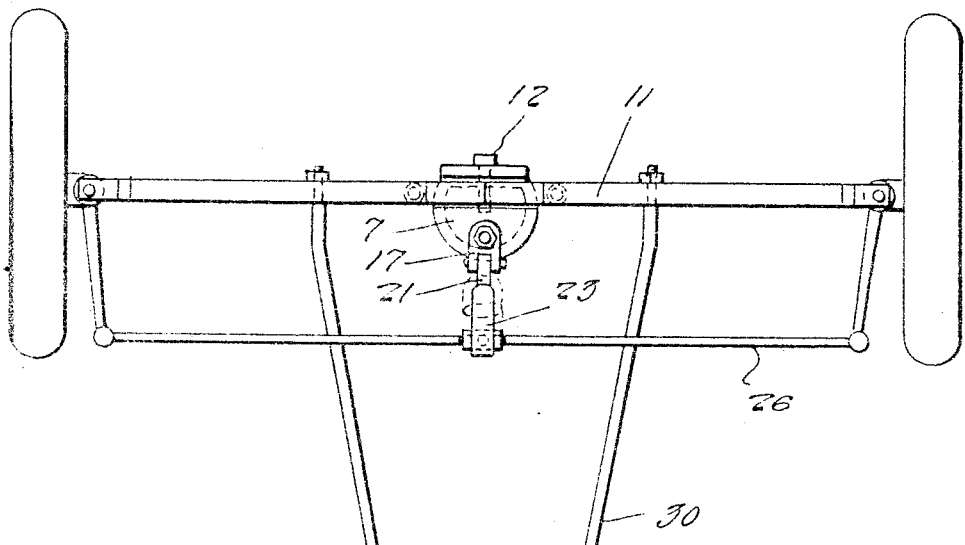
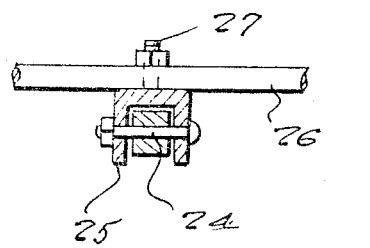
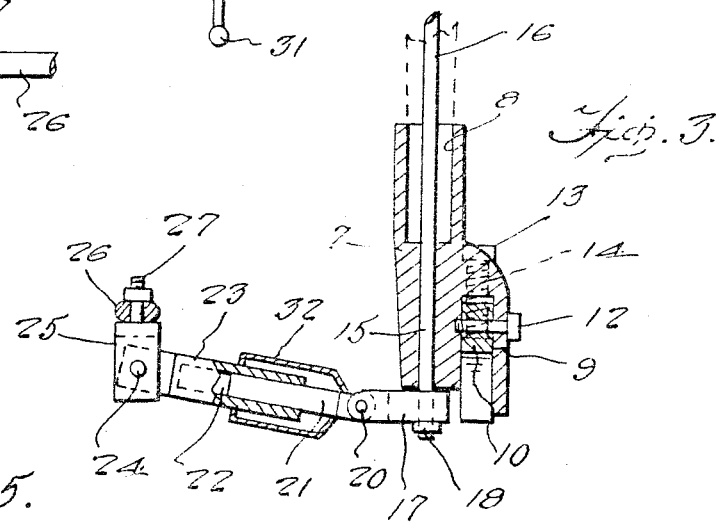
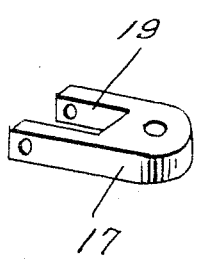

2,178,505

UNITED STATES PATENT OFFICE 2,178,505

CONVERTIBLE STEERING UNIT FOR ROW-CROP TRACTORS

Wilber Warneke, Readlyn, Iowa

Application March 4, 1939, Serial No. 259,907

4 Claims. (Cl. 280—87)

The present invention relates to row-crop tractors usually provided with a narrow front wheel unit and has for its primary object to provide an interchangeable front wheel unit of standard gage to permit use of the tractor for other purposes.

A further object of the present invention is to provide a front wheel unit for tractors of this character which may be easily and quickly interchangeably mounted on the supporting front pedestal of the tractor without necessitating any material changes in the construction or operation of the tractor, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a front elevational view.

Figure 2 is a top plan view showing the standard gage front wheel unit detached from the tractor.

Figure 3 is a vertical sectional view through the casting for supporting the pedestal of the tractor on the axle and showing the connection with the tie rod of the steering mechanism.

Figure 4 is a fragmentary sectional view of the connection of the telescoping steering rod with the tie rod, and Figure 5 is a perspective view of the connection for the front end of the telescoping steering rod.

Referring now to the drawings in detail, wherein for the purpose of illustration I have disclosed a preferred embodiment of the invention, the numeral 5 designates a farm tractor of conventional construction which is provided at its front end with a pedestal 6 employed for supporting the front end of the tractor on the row-crop front wheel unit (not shown).

In order to convert the front wheel unit to a standard tread or gage I provide a casting 7 having a socket 8 in its upper end within which the pedestal 6 is snugly fitted, the lower portion of the casting having an inverted socket 9 adapted to receive the upwardly offset section 10 of the front axle 11, the offset portion of the axle being secured in position within the socket by a bolt 12.

Shoulders 13 project outwardly from opposite sides of the casting beneath which are arranged coiled springs 14 resting on the axle.

The lower portion of the casting 7 is formed with a vertical bore 15 within which is freely inserted the steering rod 16 which projects through the bottom of the casting and is provided at its lower end with a steering rod connector 17 held in position by a nut 18. One end of the connector 17 is formed into a yoke 19 and extending transversely of the arms thereof is a pivot pin 20 to which one end of a telescoping shaft section 21 is pivotally attached, the other end of the shaft 21 being slidably inserted in the socket 22 of the shaft section 23, the latter having its rear end pivoted as at 24 to a U-shaped bracket 25 bolted to the tie rod 26 by means of the bolt 27, the opposite ends of the tie rod being connected to the steering knuckles 28 of the front wheels 29 in the usual manner.

The axle 11 is braced by means of a radius rod 30 having a ball 31 at its rear end to provide a ball and socket connection with the frame of the tractor (not shown).

From the foregoing it will be apparent that the convertible front wheel unit of standard gage may be easily and quickly secured in position to the pedestal of the tractor, when desired, the steering rod 16 providing the desired steering connection for the front wheels.

The telescoping ends of the shaft 21 and 23 may be enclosed within a dustproof shield 32.

It is believed the details of construction and manner of operation of the device will be readily apparent from the foregoing description without further detailed explanation.

Having thus described the invention, what I claim is—

1. A convertible steering attachment for tractors of a class provided with a front supporting pedestal, said steering attachment comprising a casting having a socket for receiving the pedestal, a front axle having wheels swingably supported at the ends thereof, a tie rod connecting the wheels for uniform movement, means for removably attaching the casting to the front axle of the tractor, a steering rod extending vertically through the casting and means for attaching the lower end of the rod to the tie rod.

2. A convertible steering attachment for tractors of a class provided with a front supporting pedestal, said steering attachment comprising a casting having a socket for receiving the pedestal, a front axle having wheels swingably supported at the ends thereof, a tie rod connecting the wheels for uniform movement, means for removably attaching the casting to the front axle of the tractor, a steering rod extending vertically through the casting, a tie rod attaching bracket and an adjustable steering lever connecting the lower end of the steering rod to said bracket.

3. A convertible steering attachment for tractors of a class provided with a front supporting pedestal, said steering attachment comprising a casting having a socket for receiving the pedestal, a front axle having wheels swingably supported at the ends thereof, a tie rod connecting the wheels for uniform movement, means for removably attaching the casting to the front axle of the tractor, a steering rod extending vertically through the casting, a tie rod attaching bracket and a telescoping steering lever connecting the lower end of the steering rod to said bracket.

4. In a steering connection for the front wheels of tractors, a pedestal depending from the front of the tractor, a casting having a socket adapted to accommodate the pedestal, a recess in the bottom of the casting adapted to receive the front axle of the tractor, means for securing the axle in position in the recess, spring means at opposite sides of the casting to maintain the casting level on the axle, said casting having a vertical bore, a steering rod freely mounted in the bore and tie rod connecting means attached to said steering rod.

WILBER WARNEKE.